(12) United States Patent
Hong

(10) Patent No.: US 11,119,916 B2
(45) Date of Patent: Sep. 14, 2021

(54) ELECTRONIC SYSTEM FOR ADAPTIVELY ADJUSTING ALLOCATION OF MEMORY AREA AND METHOD OF OPERATING THE ELECTRONIC SYSTEM

(71) Applicant: Samsung Electronics Co., Ltd., Suwon-si (KR)

(72) Inventor: Jung-wook Hong, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 244 days.

(21) Appl. No.: 16/511,127

(22) Filed: Jul. 15, 2019

(65) Prior Publication Data

US 2020/0050543 A1   Feb. 13, 2020

(30) Foreign Application Priority Data

Aug. 13, 2018   (KR) .................. 10-2018-0094615
Apr. 1, 2019    (KR) .................. 10-2019-0037954

(51) Int. Cl.
*G06F 12/06*   (2006.01)
*G06F 9/4401*  (2018.01)
*G06F 3/0481*  (2013.01)

(52) U.S. Cl.
CPC .......... *G06F 12/0646* (2013.01); *G06F 9/441* (2013.01); *G06F 9/4403* (2013.01); *G06F 3/04817* (2013.01); *G06F 2212/1044* (2013.01)

(58) Field of Classification Search
CPC ............. G06F 12/0284; G06F 12/0646; G06F 2212/1044; G06F 3/04817; G06F 9/4403; G06F 9/441
See application file for complete search history.

(56) References Cited

U.S. PATENT DOCUMENTS

| 7,486,964 | B2 | 2/2009 | Noh |
| 8,160,645 | B2 | 4/2012 | Lee et al. |
| 8,983,044 | B2 | 3/2015 | Mori |
| 9,542,196 | B2 | 1/2017 | Zhang et al. |

(Continued)

FOREIGN PATENT DOCUMENTS

| JP | 5366927 B2 | 12/2013 |
| JP | 5910408 B2 | 4/2016 |

(Continued)

*Primary Examiner* — Terrell S Johnson
(74) *Attorney, Agent, or Firm* — Harness, Dickey & Pierce, P.L.C.

(57) ABSTRACT

Provided are an electronic system for adaptively adjusting allocation of a memory area and a method of operating the electronic system. The electronic system includes: a modem configured to perform data transmission; at least one IP block configured to execute an application; a boot data memory configured to store first boot data corresponding to the alternative mode and second boot data corresponding to a standard mode; a main memory including a first area allocated to the modem and a second area allocated to the at least one IP block, in the standard mode; and a processor configured to boot the main memory by using the first boot data or the second boot data based on an operation mode, wherein the processor is configured to re-allocate the first area to the at least one IP block by re-booting the main memory by using the first boot data in the alternative mode.

20 Claims, 13 Drawing Sheets

(56) References Cited

U.S. PATENT DOCUMENTS

| | | | | |
|---|---|---|---|---|
| 9,615,401 B2* | 4/2017 | Geng | ................... | H04W 8/22 |
| 2015/0052299 A1* | 2/2015 | Mirichigni | .......... | G06F 13/1694 |
| | | | | 711/114 |
| 2016/0116974 A1 | 4/2016 | Ginnela et al. | | |
| 2017/0271645 A1* | 9/2017 | Brush | ................. | H01M 50/543 |

FOREIGN PATENT DOCUMENTS

| KR | 10-0517978 | 10/2005 |
|---|---|---|
| KR | 10-1151075 | 6/2012 |
| KR | 10-1318836 | 10/2013 |
| KR | 10-1636456 | 7/2016 |

\* cited by examiner

ELECTRONIC SYSTEM FOR ADAPTIVELY ADJUSTING ALLOCATION OF MEMORY AREA AND METHOD OF OPERATING THE ELECTRONIC SYSTEM

CROSS-REFERENCE TO RELATED APPLICATIONS

This application claims the benefit of Korean Patent Application Nos. 10-2018-0094615 and 10-2019-0037954, respectively filed on Aug. 13, 2018 and Apr. 1, 2019, in the Korean Intellectual Property Office, the disclosures of each of which are incorporated herein in their entirety by reference.

BACKGROUND

Example embodiments of the inventive concepts relate to an electronic system and/or a method of operating the same. For example, at least some example embodiments relate to an electronic system for adaptively adjusting allocation of a memory area and/or a method of operating the electronic system.

Factors that affect the performance of electronic systems include a capacity and a processing amount of a main memory or a system memory and an access speed. In general, dynamic random-access memory (DRAM) may be used as a main memory.

A limited resource of a main memory may be shared by a plurality of functional blocks. Accordingly, since an unused functional block that is not used by a user may be allocated to the limited resource of the main memory, an overall system speed may be reduced.

SUMMARY

Example embodiments of the inventive concepts provide an electronic system for efficiently using a limited main memory resource through an alternative mode and a method of operating the electronic system.

According to an example embodiment of the inventive concepts, there is provided an electronic system including a modem configured to perform data transmission; at least one IP block configured to execute an application; a boot data memory configured to store first boot data and second boot data, the first boot data corresponding to an alternative mode and the second boot data corresponding to a standard mode; a main memory including a first area and a second area such that, in the standard mode, the first area is allocated to the modem and the second area is allocated to the at least one IP block; and a processor configured to boot the main memory using one of the first boot data or the second boot data based on an operation mode such that, in the alternative mode, the processor re-allocates the first area to the at least one IP block by re-booting the main memory using the first boot data.

According to another example embodiment of the inventive concepts, there is provided a method of operating an electronic system including a plurality of functional blocks and a main memory, the method including receiving an alternative mode entry command requesting entry to the alternative mode while a first area of the main memory is allocated to a first functional block of the plurality of functional blocks; loading first boot data corresponding to the alternative mode; re-booting the main memory by executing the first boot data; and re-allocating the first area of the main memory allocated to the first functional block to a second functional block of the plurality of functional blocks after rebooting the main memory.

According to another example embodiment of the inventive concepts, there is provided an electronic system including an input device configured to receive an input; a plurality of functional blocks each configured to perform operations according to a user request, the plurality of functional blocks including a first functional block and a second functional block; a boot data memory configured to store first boot data and second boot data, the first boot data corresponding to an alternative mode and the second boot data corresponding to a standard mode; a main memory including a first area and a second area, the first area associated with driving the first functional block and the second area associated with driving the second functional block; and a processor configured to, boot the electronic system using one of the first boot data and the second boot data based on an operation mode, and adjust a ratio of a memory area of the first area and the second area by re-booting the electronic system using the first boot data, in response to the input device receiving an alternative mode entry command from the user.

BRIEF DESCRIPTION OF THE DRAWINGS

Example embodiments of the inventive concepts will be more clearly understood from the following detailed description taken in conjunction with the accompanying drawings in which.

DETAILED DESCRIPTION

Figure 1:
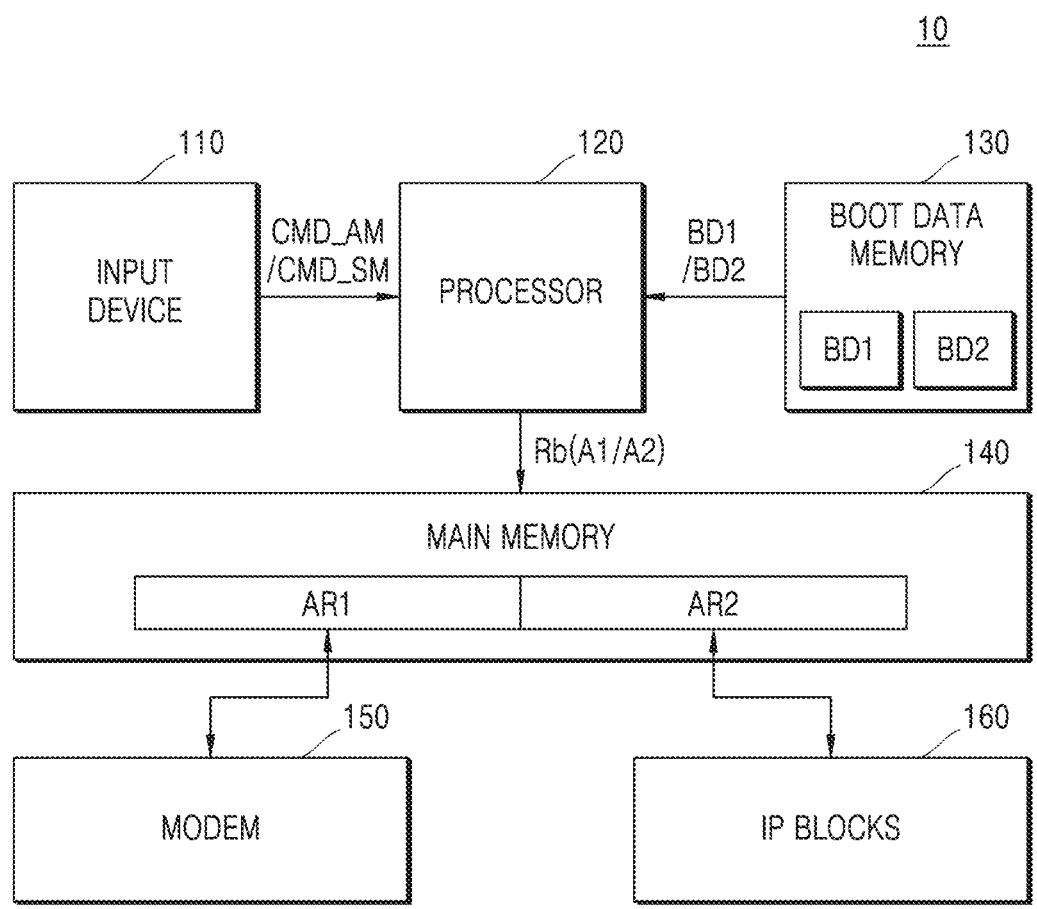
FIG. 1 is a block diagram of an electronic system according to an example embodiment of the inventive concepts.

FIG. 1 is a block diagram of an electronic system 10 according to an example embodiment of the inventive concepts.

Referring to FIG. 1, the electronic system 10 may include an input device 110, a processor 120, a boot data memory 130, a main memory 140, a modulator-demodulator (modem) 150, and intellectual property (IP) blocks 160. In an example embodiment, the input device 110, the processor 120, the boot data memory 130, the main memory 140, the modem 150, and the IP blocks 160 may be communicatably connected to one another through a bus (not shown).

The electronic system 10 may be a stationary electronic system such as a desktop computer, a workstation, a server, or an Internet of Things (IoT) device, or a portable electronic system such as a laptop computer, a cellular phone, a personal digital assistant (PDA), or a tablet personal computer (PC).

The input device 110 through which a user inputs various requests to the electronic system 10 may include a keyboard, a pointing device, and a touch panel. In an example embodiment, the user may trigger the processor 120 to enter and exit an alternative mode through the input device 110. In an example embodiment, when the user triggers to enter the alternative mode, the input device 110 may output an alternative mode entry command CMD_AM to the processor 120. In an example embodiment, when the user triggers to exit the alternative mode, the input device 110 may output a standard mode entry command CMD_SM to the processor 120.

The term 'standard mode' used herein may refer to a mode in which the modem 150, the IP blocks 160, and a system operate by allocating memory devices of a first area AR1 to the modem 150. Also, the term 'alternative mode' used herein may refer to a mode in which the modem 150 does not operate by removing the allocation of a memory area to the modem 150.

The processor 120 may be referred to as a processing unit and may include a core for executing a instruction set (e.g., Intel Architecture-32 (IA-32), 64-bit extension IA-32, x86-64, PowerPC, Sparc, MIPS, ARM, or IA-64) such as a central processing unit (CPU), a microprocessor, an application processor (AP), a digital signal processor (DSP), or a graphics processing unit (GPU). The processor 120 may access the boot data memory 130 and the main memory 140 and may change various settings related to the main memory 140 in a booting process.

The boot data memory 130 for storing first boot data BD1 and second boot data BD2 for booting may be read-only memory (ROM). The boot data memory 130 may store the first boot data BD1 and the second boot data BD2. When the input device 110 outputs the alternative mode entry command CMD_AM to the processor 120, the processor 120 may read the first boot data BD1 corresponding to an alternative mode by accessing the boot data memory 130. When the input device 110 outputs the standard mode entry command CMD_SM to the processor 120, the processor 120 may read the second boot data BD2 corresponding to a standard mode by accessing the boot data memory 130.

The main memory 140 may store data processed by a plurality of functional blocks. In an example embodiment, the main memory 140 may include a volatile memory such as dynamic random-access memory (DRAM), static random-access memory (SRAM), synchronous DRAM (SDRAM), a latch, a flip-flop, or a register, or a nonvolatile memory such as electrically erasable programmable read-only memory (EEPROM), a flash memory, phase change random-access memory (PRAM), resistive random-access memory (RRAM), nano-floating gate memory (NFGM), polymer random-access memory (PoRAM), magnetic random-access memory (MRAM), or ferroelectric random-access memory (FRAM).

The term 'functional blocks' used herein may refer to software blocks or hardware blocks for performing various operations of the electronic system 10. In an example embodiment, the functional blocks may include the modem 150 and the IP blocks 160.

The main memory 140 may include the first area AR1 allocated to the modem 150 and a second area AR2 allocated to the IP blocks 160. In an example embodiment, the modem 150 may perform communication with the outside by using a memory area allocated to the first area AR1, and the IP blocks 160 may operate an application by using a memory area allocated to the second area AR2.

According to an example embodiment of the inventive concepts, when the processor 120 receives the alternative mode entry command CMD_AM, the processor 120 may re-boot the main memory 140 based on first memory area information A1 included in the first boot data BD1. In another example embodiment, the processor 120 may re-boot the electronic system 10 based on the first boot data BD1 in response to the alternative mode entry command CMD_AM.

In an example embodiment, the processor 120 may re-allocate, to the IP blocks 160, the first area AR1 of the main memory 140 allocated to the modem 150. That is, the processor 120 may change a memory area included in the first area AR1 to the second area AR2 allocated to the IP blocks 160.

In another example embodiment, when the processor 120 receives the standard mode entry command CMD_SM, the processor 120 may re-boot the main memory 140 based on second memory area information A2 included in the second boot data BD2. In an example embodiment, the processor 120 may re-allocate, to the modem 150, at least a part of the second area AR2 of the main memory 140 allocated to the IP blocks 160. That is, the processor 120 may change at least a part of a memory area included in the second area AR2 to the first area AR1 allocated to the modem 150. Accordingly, the user may adaptively operate a limited resource of the main memory 140.

The modem 150 may access a network outside an electronic system 10. In an example embodiment, the modem 150 may include communication links, and the communication links may include wired links, optical links, wireless links, or other links.

The IP blocks 160 may be reusable unit of logic, cell, or integrated circuit layout design. The IP blocks 160 can be used as building blocks within application-specific integrated circuit (ASIC) or field programmable gate array (FPGA) designs. The IP blocks 160 may be hard cores, firm cores, and/or a soft cores. The IP blocks 160 may include at least one functional block that operates an application executed in the electronic system 10. In an example embodiment, the IP blocks 160 may include a hardware block such as a GPU, an image sensor, a camera, or a neural network processing unit (NPU) and a software block that executes various applications.

The processor 120 and/or the IP blocks 160 may be implemented using processing circuitry such as hardware including logic circuits, a hardware/software combination such as a processor executing software; or a combination thereof. For example, the processing circuitry may include, but is not limited to, a central processing unit (CPU), an arithmetic logic unit (ALU), a digital signal processor, a microcomputer, a field programmable gate array (FPGA), a System-on-Chip (SoC) a programmable logic unit, a microprocessor, or an application-specific integrated circuit (ASIC), etc.

Figure 2:
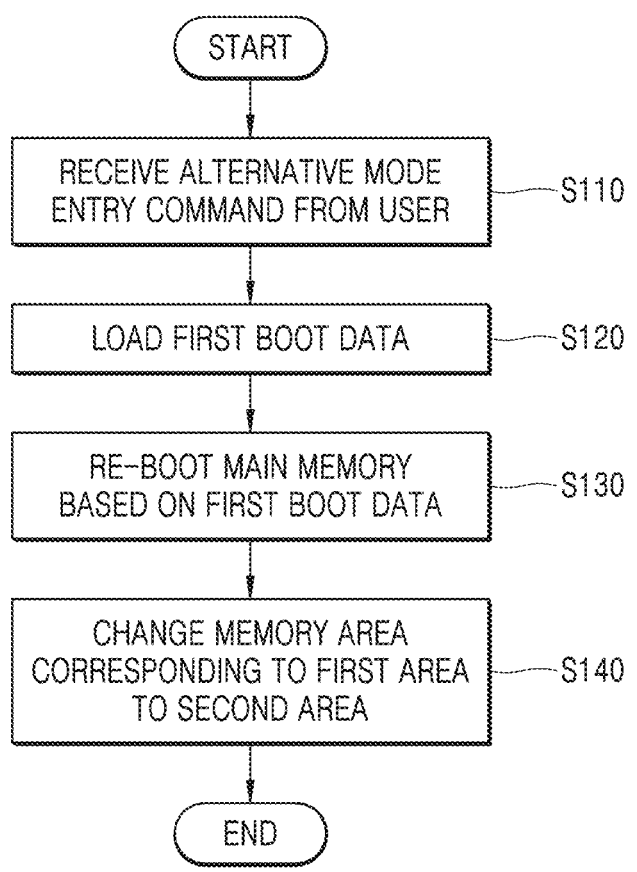
FIG. 2 is a flowchart of a method of operating an electronic system, according to an example embodiment of the inventive concepts.

FIG. 2 is a flowchart of a method of operating the electronic system 10, according to an example embodiment of the inventive concepts.

Referring to FIGS. 1 and 2, in operation S110, the electronic system 10 may receive the alternative mode entry command CMD_AM from a user.

In operation S120, the electronic system 10 may load the first boot data BD1 in response to the alternative mode entry command CMD_AM.

In operation S130, the electronic system 10 may re-boot the main memory 140 based on the first boot data BD1.

In operation S140, the electronic system 10 may change a memory area of the main memory 140 corresponding to the first area AR1 to the second area AR2 allocated to the IP blocks 160 in a process of re-booting the main memory 140. To this end, the first boot data BD1 according to an example embodiment of the inventive concepts may include re-allocation information for re-allocating, to the IP blocks 160, the first area AR1 which the modem 150 may use.

According to an example embodiment of the inventive concepts, the electronic system 10 may efficiently use a limited resource of the main memory 140 by providing a user an alternative mode so that the first area AR1 of the main memory 140 allocated to the modem 150 is allocated to other IP blocks 160. Also, according to an example embodiment of the inventive concepts, when the electronic system 10 enters the alternative mode, the electronic system 10 may re-boot the main memory 140, and thus the alternative mode having different memory allocation information from a standard mode may be stably performed in the main memory 140.

Figure 3:
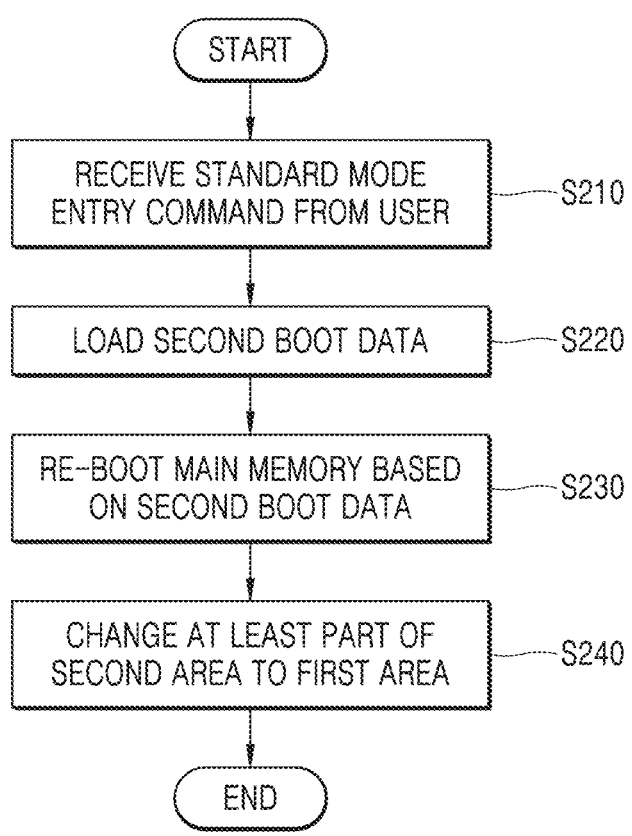
FIG. 3 is a flowchart of a method of operating the electronic system, according to an example embodiment of the inventive concepts.

FIG. 3 is a flowchart of a method of operating the electronic system 10 according to an example embodiment of the inventive concepts.

Referring to FIGS. 1 and 3, in operation S210, the electronic system 10 may receive the standard mode entry command CMD_SM from a user.

In operation S220, the electronic system 10 may load the second boot data BD2 in response to the standard mode entry command CMD_SM.

In operation S230, the electronic system 10 may re-boot the main memory 140 based on the second boot data BD2.

In operation S240, the electronic system 10 may change at least a part of a memory area of the main memory 140 corresponding to the second area AR2 allocated to the IP blocks 160 to the first area AR1 in a process of re-booting the main memory 140.

In an example embodiment of the inventive concepts, the electronic system 10 may enter a standard mode by re-allocating, to the modem 150, at least a part of the second area AR2 allocated to the IP blocks 160 based on the standard mode entry command CMD_SM. Also, when the electronic system 10 enters a standard mode, the electronic system 10 may re-boot the main memory 140, and thus the standard mode having different allocation information from an alternative mode may be stably performed in the main memory 140.

Figure 4:
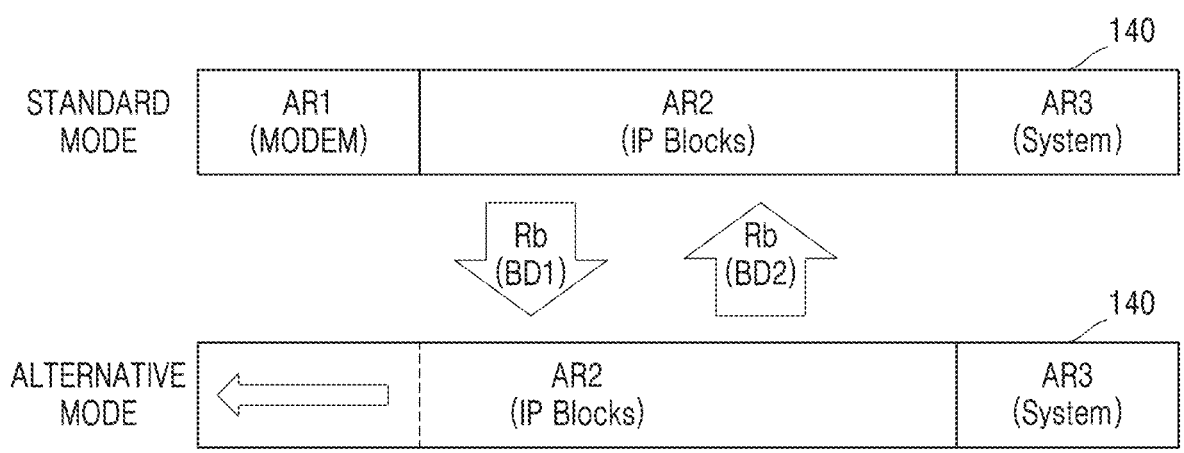
FIG. 4 is a diagram for describing an operation of the electronic system, according to an example embodiment of the inventive concepts.

FIG. 4 is a diagram for describing an operation of the electronic system 10 according to an example embodiment of the inventive concepts.

Referring to FIGS. 1 and 4, in a standard mode, the main memory 140 may be divided into the first area AR1 allocated to the modem 150, the second area AR2 allocated to the IP blocks 160, and a third area AR3 allocated to a system. The modem 150 may perform various operations for communication by using memory devices included in the first area AR1, and the IP blocks 160 may operate an application according to a user's request by using memory devices included in the second area AR2.

When the electronic system 10 is triggered by the user to enter an alternative mode, the electronic system 10 may enter the alternative mode by being re-booted by using the first boot data BD1. The electronic system 10 may enter the alternative mode by re-allocating the memory devices included in the first area AR1 to the second area AR2. That is, the electronic system 10 may enter the alternative mode by re-allocating, to the IP blocks 160, the memory devices allocated to the modem 150.

When the electronic system 10 is triggered by the user to exit the alternative mode, the electronic system 10 may enter the standard mode by being re-booted by using the second boot data BD2. The electronic system 10 may enter the standard mode by re-allocating at least some of the memory devices included in the second area AR2 to the first area AR1. That is, the electronic system 10 may enter the standard mode by re-allocating, to the modem 150, at least some of the memory devices allocated to the IP blocks 160.

Figure 5:
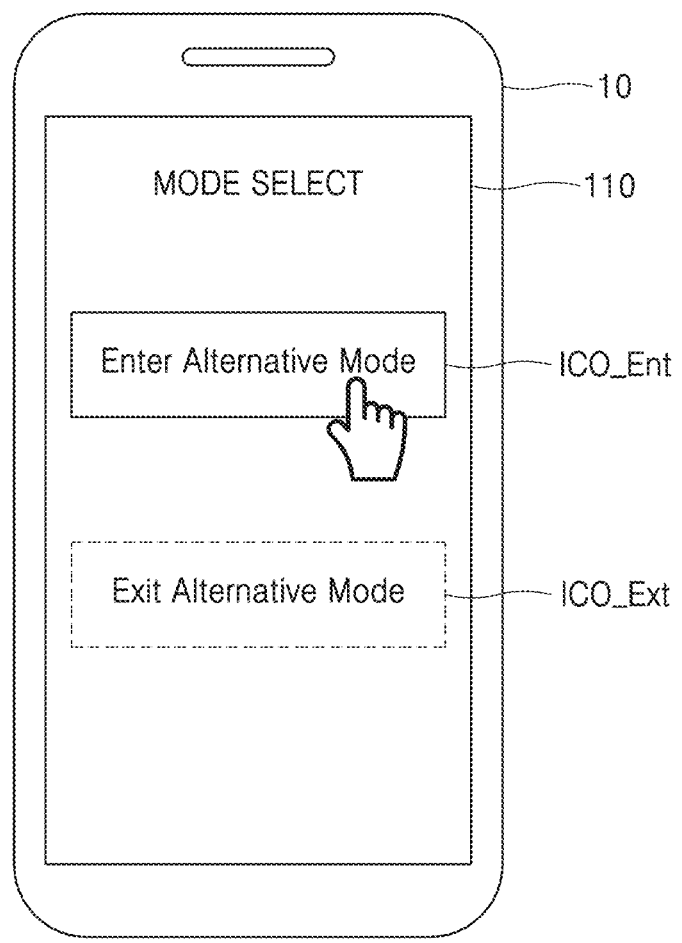
FIG. 5 is a view for describing a method of operating the electronic system, according to an example embodiment of the inventive concepts.

FIG. 5 is a view for describing a method of operating the electronic system 10, according to an example embodiment of the inventive concepts.

Referring to FIG. 5, the electronic system 10 may include the input device 110. In an example embodiment, the input device 110 may be a touch panel that also functions as an output device. The input device 110 may include an alternative mode entry icon ICO_Ent and an alternative mode exit icon ICO_Ext.

In an example embodiment, in a standard mode, the alternative mode entry icon ICO_Ent may be displayed to a user, and in an alternative mode, the alternative mode exit icon ICO_Ext may be displayed to the user, through the input device 110.

The user may enter the alternative mode by selecting the alternative mode entry icon ICO_Ent in the standard mode. In an example embodiment, when the user selects the alternative mode entry icon ICO_Ent, the electronic system 10 may re-allocate, to IP blocks, a memory area of a main memory allocated to a modem. Accordingly, the user may use the alternative mode that is operated with the IP blocks instead of the modem.

The user may enter the standard mode by selecting the alternative mode exit icon ICO_Ext in the alternative mode. In an example embodiment, when the user selects the alternative mode exit icon ICO_Ext, the electronic system 10 may re-allocate, to the modem, at least some of memory areas of the main memory allocated to the IP blocks. Accordingly, the user may use the standard mode that is operated with the modem and the IP blocks.

Figure 6:
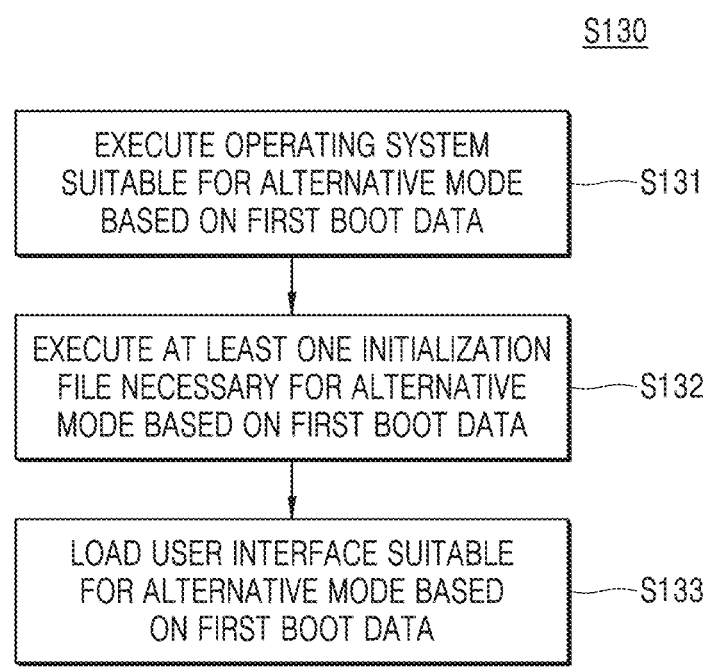
FIG. 6 is a flowchart of a method of operating the electronic system, according to an example embodiment of the inventive concepts.

FIG. 6 is a flowchart of a method of operating the electronic system 10 according to an example embodiment of the inventive concepts. In detail, FIG. 6 is a flowchart illustrating operation S130 of FIG. 2 in which a system is re-booted based on first boot data.

Referring to FIGS. 1 and 6, in operation S131, when the electronic system 10 receives the alternative mode entry command CMD_AM, the electronic system 10 may execute an operating system (OS) suitable for an alternative mode based on the first boot data BD1 stored in the boot data memory 130.

In operation S132, the electronic system 10 may execute at least one initialization file for the alternative mode based on the first boot data BD1.

In operation S133, the electronic system 10 may load a user interface (UI) suitable for the alternative mode.

Although FIG. 6 illustrates an operation of the electronic system 10 when the electronic system 10 enters the alternative mode, this is an example, and even when the electronic system 10 receives the standard mode entry command CMD_SM, the electronic system 10 may enter a standard mode by loading an OS, an initialization file, and a UI based on boot data associated with the standard mode.

Figure 7:
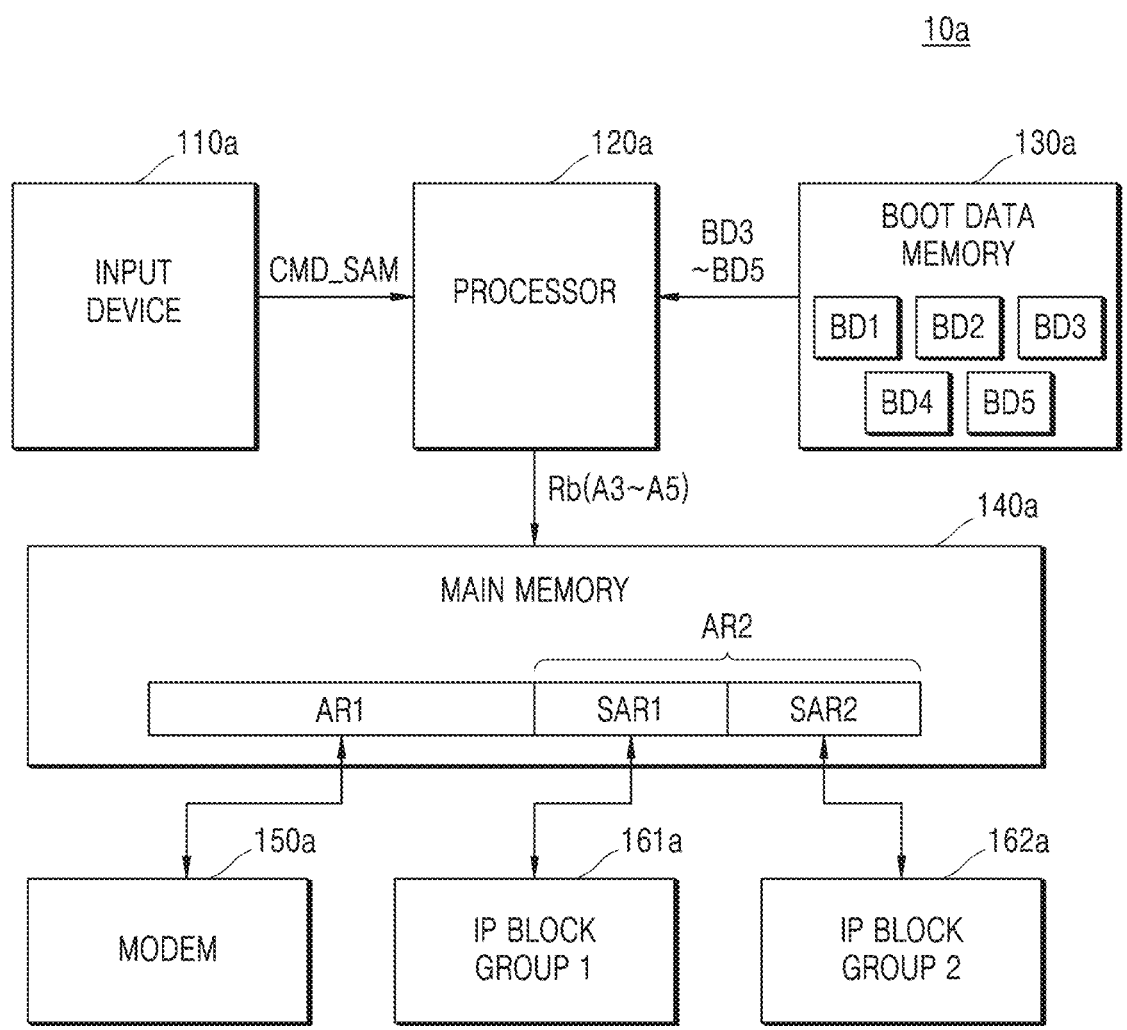
FIG. 7 is a diagram of an electronic system according to an example embodiment of the inventive concepts.

FIG. 7 is a diagram of an electronic system 10a according to an example embodiment of the inventive concepts. The same description as that made with reference to FIG. 1 will not be given.

Referring to FIG. 7, the electronic system 10a may include an input device 110a, a processor 120a, a boot data memory 130, a main memory 140a, a modem 150a, a first IP block group 161a, and a second IP block group 162a.

The boot data memory 130a may store the first boot data BD1 corresponding to an alternative mode, the second boot data BD2 corresponding to a standard mode, third boot data BD3 corresponding to a first sub-alternative mode, fourth boot data BD4 corresponding to a second sub-alternative mode, and fifth boot data BD5 corresponding to a third sub-alternative mode. The alternative mode and the standard mode have been described with reference to FIGS. 1 through 6, and thus a repeated explanation thereof will not be given.

The main memory 140a may include the first area AR1 allocated to the modem 150a and the second area AR2 allocated to IP blocks. The second area AR2 may be divided into a first sub-area SAR1 allocated to the first IP block group 161a and a second sub-area SAR2 allocated to the second IP block group 162a.

The IP blocks may be grouped into the first IP block group 161a and the second IP block group 162a. In an example embodiment, the IP blocks may be grouped into the first IP block group 161a and the second IP block group 162a based on characteristics of the IP blocks, and in another example embodiment, the IP blocks may be grouped into the first IP block group 161a and the second IP block group 162a based on a user's setting information. As described with reference to FIGS. 1 through 6, the first IP block group 161a may perform various operations by using the first sub-area SAR1, and the second IP block group 162a may perform various operations by using the second sub-area SAR2.

The processor 120a may receive a sub-alternative mode entry command CMD_SAM. The processor 120a may receive one of the third boot data BD3 through the fifth boot data BD5 from the boot data memory 130a in response to the sub-alternative mode entry command CMD_SAM.

In an example embodiment, the sub-alternative mode entry command CMD_SAM may correspond to the first through third sub-alternative modes, and the processor 120a may receive one of the third boot data BD3 through the fifth boot data BD5 based on the sub-alternative mode entry command CMD_SAM. The processor 120a may re-boot the main memory 140a based on one of third memory area information A3 included in the third boot data BD3, fourth memory area information A4 included in the fourth boot data BD4, and fifth memory area information A5 included in the fifth boot data BD5.

In an example embodiment, the processor 120a may re-allocate, to the second IP block group 162a, a memory area included in the first sub-area SAR1 of the main memory 140a allocated to the first IP block group 161a based on the third boot data BD3.

In an example embodiment, the processor 120a may re-allocate, to the modem 150a, a memory area included in the first sub-area SAR1 of the main memory 140a allocated to the first IP block group 161a based on the fourth boot data BD4.

In an example embodiment, the processor 120a may re-allocate, to the first IP block group 161a, a memory area included in the first area AR1 of the main memory 140a allocated to the modem 150a based on the fifth boot data BD5.

Figure 8:
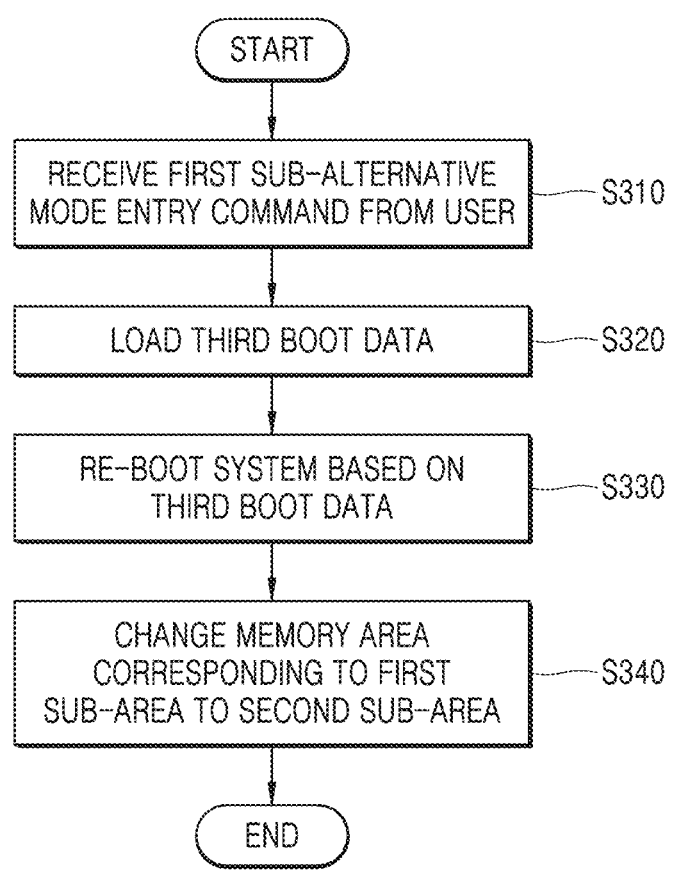
FIG. 8 is a flowchart of a method of operating the electronic system, according to an example embodiment of the inventive concepts.

FIG. 8 is a flowchart of a method of operating the electronic system 10a, according to an example embodiment of the inventive concepts. In detail, FIG. 8 is a flowchart illustrating an example where the electronic system 10a enters a first sub-alternative mode by using the third boot data BD3.

Referring to FIGS. 7 and 8, in operation S310, the electronic system 10a may receive the sub-alternative mode entry command CMD_SAM.

In operation S320, the electronic system 10a may load the third boot data BD3 in response to the sub-alternative mode entry command CMD_SAM.

In operation S330, the electronic system 10a may re-boot the main memory 140a based on the third boot data BD3.

In operation S340, the electronic system 10a may change a memory area of the main memory 140 corresponding to the first sub-area SAR1 to the second sub-area SAR2 allocated to the second IP block group 162a in a process of re-booting the main memory 140a.

According to an example embodiment of the inventive concepts, the electronic system 10a may efficiently use a limited resource of the main memory 140a by providing a first sub-alternative mode to a user so that the first sub-area SAR1 of the main memory 140a allocated to the first IP block group 161a is allocated to the second IP block group 162a.

Also, according to an example embodiment of the inventive concepts, when the electronic system 10a enters the first sub-alternative mode, the first sub-alternative mode having different allocation information from a standard mode and an alternative mode may be stably performed by re-booting the main memory 140.

Figure 9A:
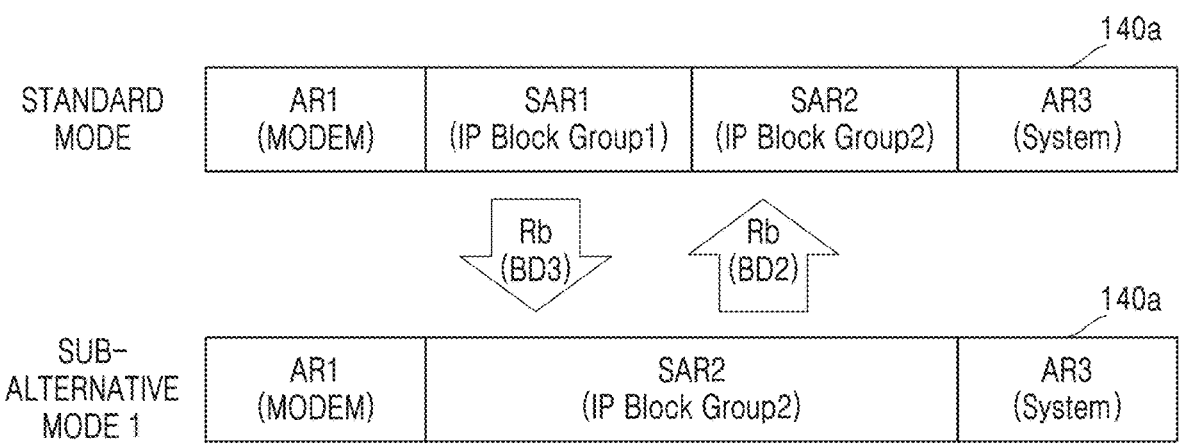
FIG. 9A is a diagram illustrating an operation of the electronic system, according to an example embodiment of the inventive concepts.

FIG. 9A is a diagram for describing an operation of the electronic system 10a, according to an example embodiment of the inventive concepts. In detail, FIG. 9A illustrates an example where the electronic system 10a enters or exits a first sub-alternative mode.

Referring to FIGS. 7 and 9A, in a standard mode, the main memory 140a may be divided into the first area AR1 allocated to the modem 150a, a first sub-area SAR1 allocated to the first IP block group 161a, a second sub-area SAR2 allocated to the second IP block group 162a, and a third area AR3 allocated to a system. The modem 150a may perform various operations for communication by using memory devices included in the first area AR1, the first IP block group 161a may carry out a user's request by using memory devices included in the first sub-area SAR1, and the second IP block group 162*a* may carry out the user's request by using memory devices included in the second area SAR2.

When the electronic system 10*a* is triggered by the user to enter a first sub-alternative mode, the electronic system 10*a* may re-boot the main memory 140*a* by using the third boot data BD3 and may enter the first sub-alternative mode by re-allocating memory devices included in the first area SAR1 to the second sub-area SAR2. That is, the electronic system 10*a* may enter the first sub-alternative mode by re-allocating, to the second IP block group 162*a*, memory devices allocated to the first IP block group 161*a*.

When the electronic system 10*a* is triggered by the user to exit the first sub-alternative mode, the electronic system 10*a* may re-boot the main memory 140*a* by using the second boot data BD2 and may enter a standard mode by re-allocating at least some of memory devices included in the second sub-area SAR2 to the first sub-area SAR1. That is, the electronic system 10*a* may enter the standard mode by re-allocating, to the first IP block group 161*a*, at least some of memory devices allocated to the second IP block group 162*a*.

Figure 9B:
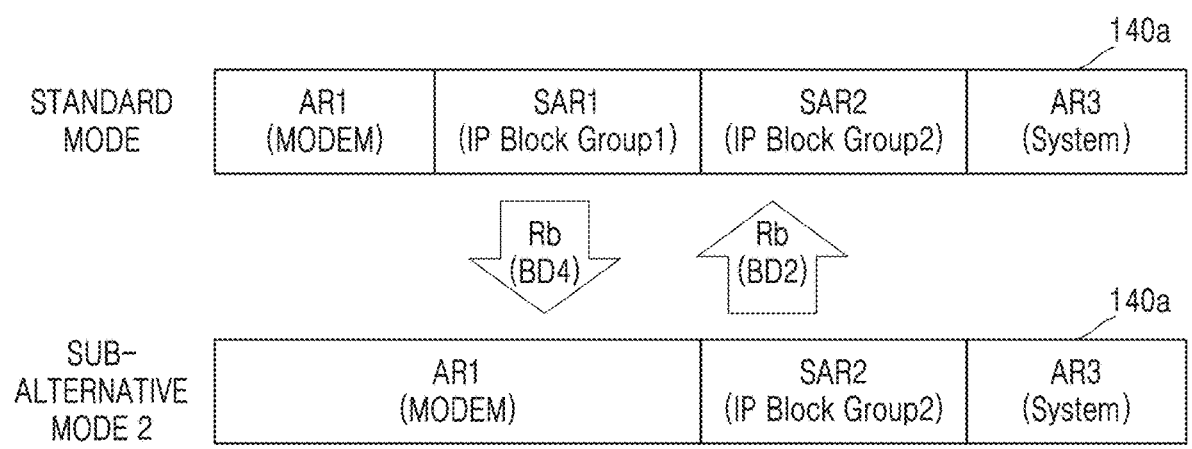
FIG. 9B is a diagram illustrating an operation of the electronic system, according to an example embodiment of the inventive concepts.

FIG. 9B is a diagram for describing an operation of the electronic system 10*a* according to an example embodiment of the inventive concepts. In detail, FIG. 9B is a diagram illustrating an example where the electronic system 10*a* enters or exits a second sub-alternative mode. The same description as that made with reference to FIG. 9A will not be given.

Referring to FIG. 9B, when the electronic system 10*a* is triggered by the user to enter a second sub-alternative mode, the electronic system 10*a* may re-boot the main memory 140*a* by using the fourth boot data BD4 and may enter the second sub-alternative mode by re-allocating memory devices included in the first sub-area SAR1 to the first area AR1. That is, the electronic system 10*a* may enter the second sub-alternative mode by re-allocating memory devices included in the first IP block group 161*a* to the modem 150*a*.

When the electronic system 10*a* is triggered by the user to exit the second sub-alternative mode, the electronic system 10*a* may re-boot the main memory 140*a* by using the second boot data BD2 and may enter a standard mode by re-allocating at least some of memory devices included in the first area AR1 to the first sub-area SAR1. That is, the electronic system 10*a* may enter the standard mode by re-allocating, to the first IP block group 161*a*, at least some of memory devices allocated to the modem 150*a*.

Figure 9C:
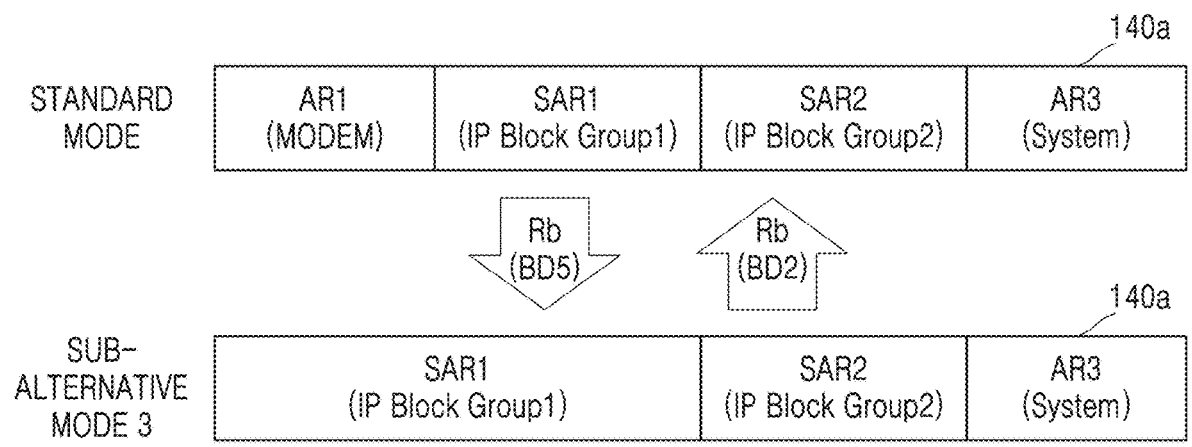
FIG. 9C is a diagram illustrating an operation of the electronic system, according to an example embodiment of the inventive concepts.

FIG. 9C is a diagram for describing an operation of the electronic system 10*a* according to an example embodiment of the inventive concepts. In detail, FIG. 9C is a diagram illustrating an example where the electronic system 10*a* enters or exits a third sub-alternative mode.

Referring to FIG. 9C, when the electronic system 10*a* is triggered by the user to enter a third sub-alternative mode, the electronic system 10*a* may re-boot the main memory 140*a* by using the fifth boot data BD5 and may enter a second sub-alternative mode by re-allocating memory devices included in the first area AR1 to the first sub-area SAR1. That is, the electronic system 10*a* may enter the third sub-alternative mode by re-allocating, to the first IP block group 161*a*, memory devices allocated to the modem 150*a*.

When the electronic system 10*a* is triggered by the user to exit the third sub-alternative mode, the electronic system 10*a* may re-boot the main memory 140*a* by using the second boot data BD2 and may enter a standard mode by re-allocating at least some of memory devices included in the first sub-area SAR1 to the first area AR1. That is, the electronic system 10*a* may enter the standard mode by re-allocating, to the modem 150*a*, at least some of memory devices allocated to the first IP block group 161*a*.

Figure 10:
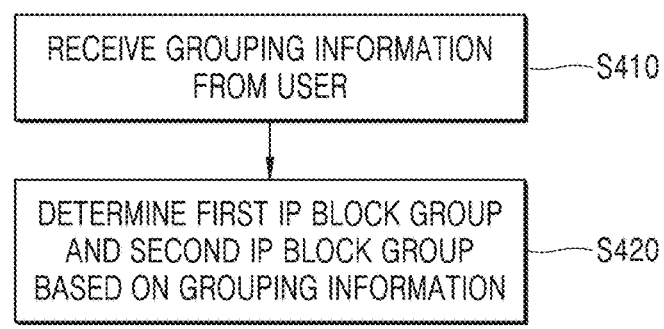
FIG. 10 is a flowchart of a method of operating the electronic system, according to an example embodiment of the inventive concepts.

FIG. 10 is a flowchart of a method of operating the electronic system 10*a*, according to an example embodiment of the inventive concepts.

Referring to FIGS. 7 and 10, in operation S410, the electronic system 10*a* may receive grouping information. A user may group one or more IP blocks into one of the first IP block group 161*a* and the second IP block group 162*a*. The grouping information may include information about IP blocks belonging to the first IP block group 161*a* and IP blocks belonging to the second IP block group 162*a* determined after the user's grouping.

In operation S420, the electronic system 10*a* may determine the IP blocks belonging to the first IP block group 161*a* and the IP blocks belonging to the second IP block group 162*a* based on the grouping information.

Figure 11:
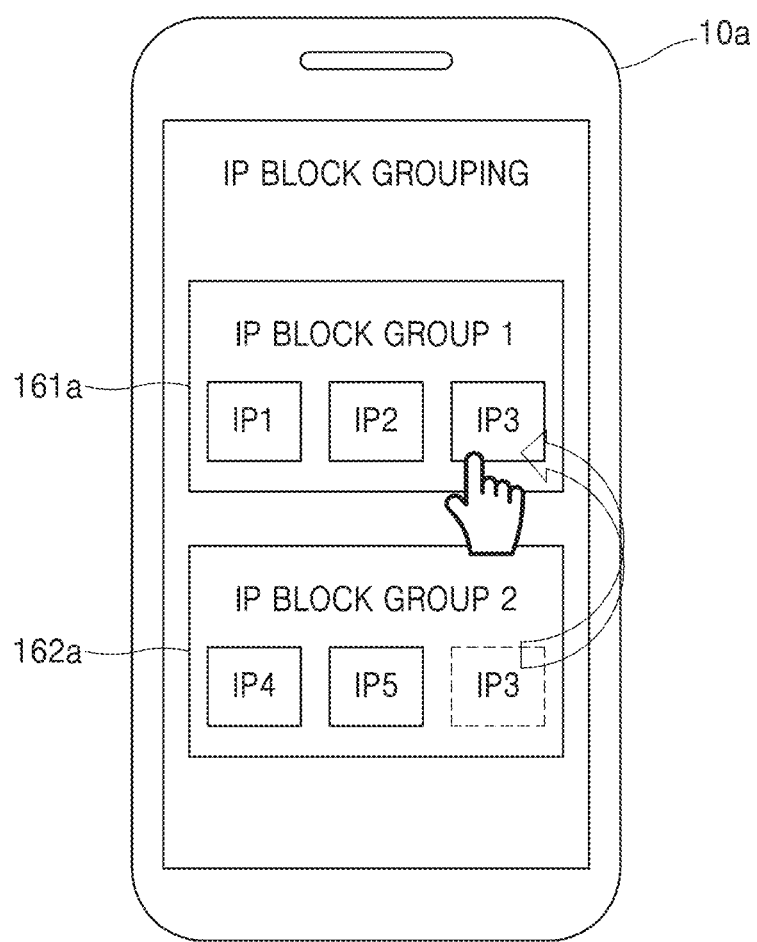
FIG. 11 is a diagram of the electronic system according to an example embodiment of the inventive concepts.

FIG. 11 is a view of the electronic system 10*a* according to an example embodiment of the inventive concepts.

Referring to FIG. 11, the electronic system 10*a* may display to a user a window for designating the first IP block group 161*a* and the second IP block group 162*a*, and the user may determine IP blocks belonging to the first IP block group 161*a* and the second IP block group 162*a*. The electronic system 10*a* may generate the determined IP blocks belonging to the first IP block group 161*a* and the second IP block group 162*a* as grouping information.

In FIG. 11, the user may move a third IP block IP3 from the second IP block group 162*a* to the first IP block group 161*a*, and the electronic system 10*a* may generate grouping information so that a first IP block IP1, a second IP block IP2, and the third IP block IP3 are included in the first IP block group 161*a*, and a fourth IP block IP4 and a fifth IP block IP5 are included in the second IP block group 162*a*.

Figure 12:
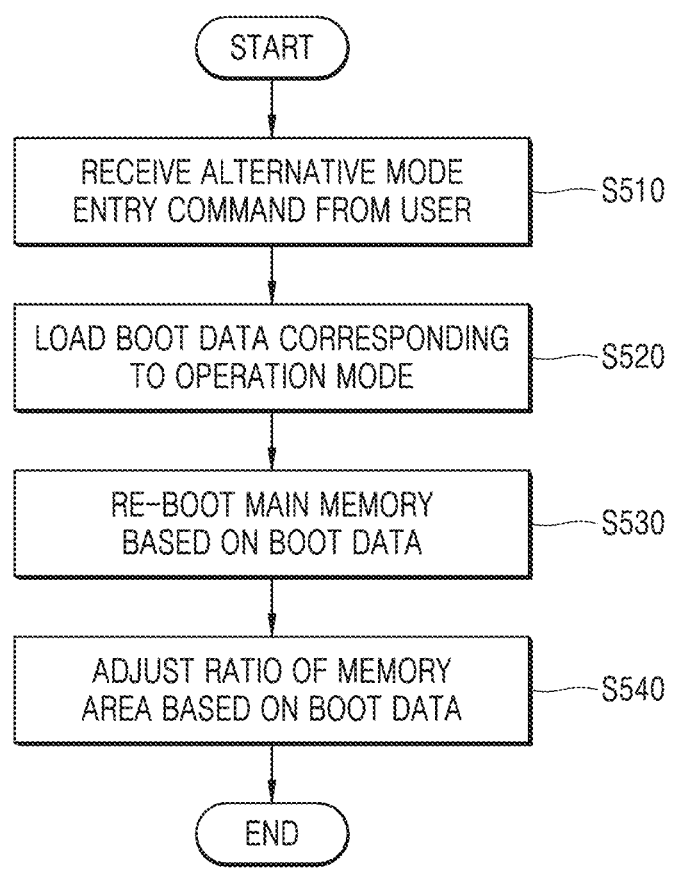
FIG. 12 is a flowchart of a method of operating an electronic system, according to an example embodiment of the inventive concepts.

FIG. 12 is a flowchart of a method of operating an electronic system, according to an example embodiment of the inventive concepts.

Referring to FIG. 12, in operation S510, the electronic system may receive an alternative mode entry command from a user.

In operation S520, the electronic system may load boot data corresponding to an operation mode corresponding to the alternative mode entry command.

In operation S530, the electronic system may re-boot a main memory based on the loaded boot data.

In operation S540, the electronic system may adjust a ratio of a memory area allocated to each functional block from the main memory based on the boot data.

In an example embodiment, the electronic system may adjust a ratio of a memory area allocated to at least one functional block based on ratio information included in the alternative mode entry command received from the user.

In an example embodiment, the electronic system may adjust a ratio of a memory area allocated to at least one functional block based on desired (or, alternatively, predetermined) ratio information.

Figure 13:
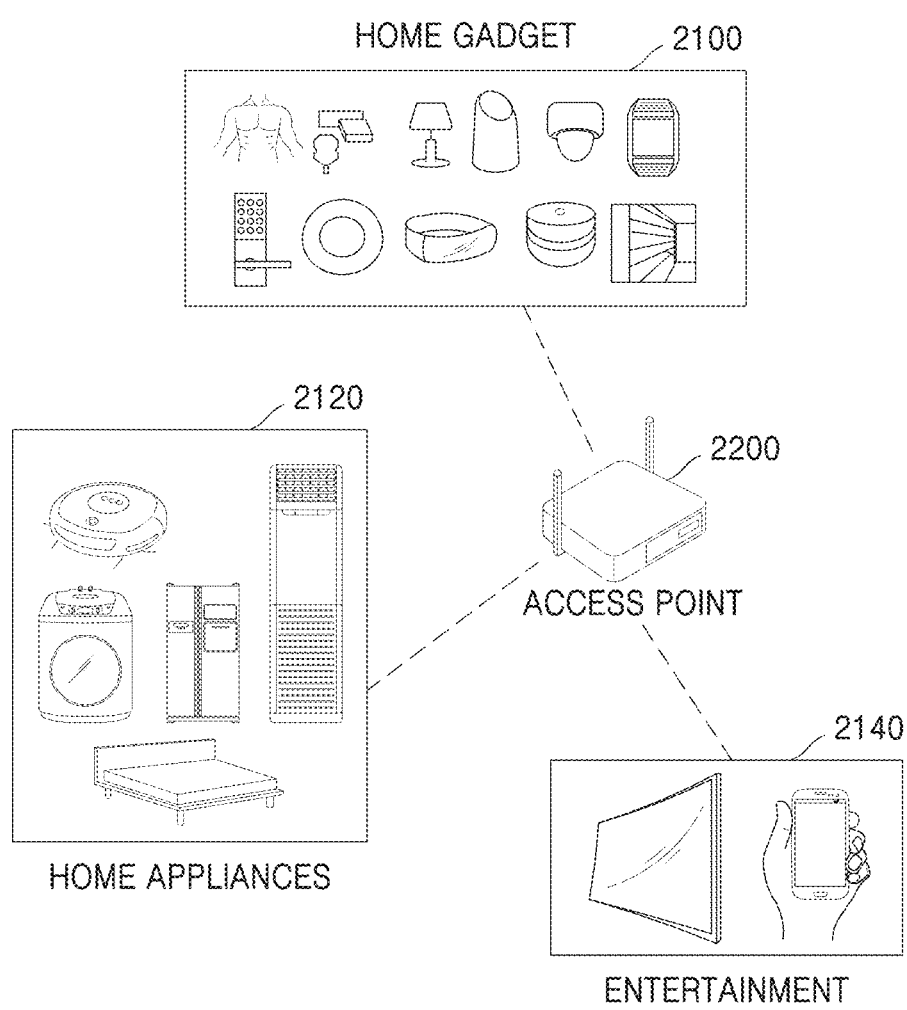
FIG. 13 is a diagram illustrating communication devices including an electronic system according to an example embodiment of the inventive concepts.

FIG. 13 is a diagram illustrating communication devices including an electronic system according to an example embodiment of the inventive concepts.

Referring to FIG. 13, a home gadget 2100, a home appliance 2120, an entertainment device 2140, and an access point (AP) 2200 may include an electronic system according to example embodiments of the inventive concepts. In some embodiments, the home gadget 2100, the home appliance 2120, the entertainment device 2140, and the AP 2200 may constitute an Internet of Things (IoT) network system.

Communication devices illustrated in FIG. 13 are examples, and it will be understood that other communication devices not illustrated in FIG. 13 may include a wireless communication apparatus according to an example embodiment of the inventive concepts.

The home gadget 2100, the home appliance 2120, the entertainment device 2140, and the AP 2200 may adaptively adjust a memory area allocated to at least one functional block by using an electronic system according to example embodiments of the inventive concepts. In an example embodiment, the home gadget 2100, the home appliance 2120, the entertainment device 2140, and the AP 2200 may perform re-booting for re-allocating a memory area allocated to a modem to other IP blocks in response to an alternative mode entry command. Accordingly, the home gadget 2100, the home appliance 2120, the entertainment device 2140, and the AP 2200 may efficiently use a limited memory resource.

While example embodiments of the inventive concepts have been particularly shown and described with reference to embodiments thereof by using specific terms, the embodiments and terms have merely been used to explain the example embodiments of the inventive concepts and should not be construed as limiting the scope of the example embodiments of the inventive concepts as defined by the claims. Accordingly, it will be understood by one of ordinary skill in the art that substitutes, changes, and modifications may be made without departing from the scope of the present invention defined by the claims. Therefore, the scope of the example embodiments of the inventive concepts is defined not by the detailed description of the example embodiments of the inventive concepts but by the appended claims.

What is claimed is:

1. An electronic system comprising:
a modem configured to perform data transmission;
at least one IP block configured to execute an application;
a boot data memory configured to store first boot data and second boot data, the first boot data corresponding to an alternative mode and the second boot data corresponding to a standard mode;
a main memory including a first area and a second area such that, in the standard mode, the first area is allocated to the modem and the second area is allocated to the at least one IP block; and
a processor configured to boot the main memory using one of the first boot data or the second boot data based on an operation mode such that, in the alternative mode, the processor re-allocates the first area to the at least one IP block by re-booting the main memory using the first boot data.

2. The electronic system of claim 1, further comprising:
an input device configured to receive an input from a user, wherein
the processor is further configured to re-allocate the first area to the at least one IP block in response to an alternative mode entry command received through the input device.

3. The electronic system of claim 2, further comprising:
an output device configured to display an alternative mode entry icon, wherein
the input device is further configured to detect whether the alternative mode entry icon is selected, and
the processor is further configured to re-boot the main memory using the first boot data, in response to selection of the alternative mode entry icon.

4. The electronic system of claim 2, wherein, when a standard mode entry command is received, the processor is further configured to re-allocate at least a part of the second area to the modem by re-booting the main memory using the second boot data.

5. The electronic system of claim 1, wherein the first boot data includes information associated with an operating system associated with executing the alternative mode, and wherein
the processor is further configured to execute the operating system based on the first boot data.

6. The electronic system of claim 1, wherein the first boot data includes information associated with at least one initialization file corresponding to the alternative mode, and wherein
the processor is further configured to execute the at least one initialization file based on the first boot data.

7. The electronic system of claim 1, wherein the first boot data includes information associated with a user interface used in the alternative mode, and wherein
the processor is further configured to load the user interface to the main memory based on the first boot data.

8. The electronic system of claim 1, wherein the at least one IP block includes a first IP block group and a second IP block group, the at least one IP block grouped into the first IP block group and the second IP block group according to a set criterion, and wherein
the processor is further configured to further store third boot data corresponding to a sub-alternative mode such that, in the sub-alternative mode, the first IP block group does not access the main memory.

9. The electronic system of claim 8, wherein the second area includes a first sub-area and a second sub-area, the first sub-area allocated to the first IP block group and the second sub-area allocated to the second IP block group, and wherein
the processor is further configured to re-allocate the first sub-area to the second IP block group by re-booting the main memory using the third boot data in response to a sub-alternative mode entry command.

10. The electronic system of claim 8, wherein the second area includes a first sub-area and a second sub-area, the first sub-area allocated to the first IP block group and the second sub-area allocated to the second IP block group, and wherein
the processor is configured to re-allocate the first sub-area to the modem by re-booting the main memory using the third boot data in response to a sub-alternative mode entry command.

11. The electronic system of claim 8, wherein the processor is further configured to,
receive grouping information, and
divide the first IP block group and the second IP block group based on the grouping information.

12. The electronic system of claim 1, wherein the at least one IP block includes a first IP block group and a second IP block group, the at least one IP block being grouped into the first IP block group and the second IP block group according to a set criterion, and wherein
the processor is further configured to,
store third boot data corresponding to a sub-alternative mode, and
re-allocate the first area to the first IP block group by re-booting the main memory using the third boot data, in response to a sub-alternative mode entry command.

13. A method of operating an electronic system including a plurality of functional blocks and a main memory, the method comprising:

receiving an alternative mode entry command requesting entry to the alternative mode while a first area of the main memory is allocated to a first functional block of the plurality of functional blocks;

loading first boot data corresponding to the alternative mode;

re-booting the main memory by executing the first boot data; and re-allocating the first area of the main memory allocated to the first functional block to a second functional block of the plurality of functional blocks after rebooting the main memory.

14. The method of claim 13, wherein
the first functional block includes a modulator-demodulator (MODEM), and
the first boot data includes information for allocating the first area to at least one intellectual property (IP) block for executing an application.

15. The method of claim 13, further comprising:
receiving a standard mode entry command requesting entry to a standard mode;
loading second boot data corresponding to the standard mode;
re-booting the electronic system by executing the second boot data; and
re-allocating the first area to the first functional block after rebooting the electronic system.

16. The method of claim 13, wherein the first boot data includes information associated with an operating system and a user interface for executing the alternative mode, and wherein the re-booting comprises:
executing the operating system based on the first boot data; and
displaying the user interface based on the first boot data.

17. The method of claim 13, wherein the main memory includes a second area for driving at least one IP block, and wherein the re-booting comprises:
allocating the first area to the at least one IP block.

18. The method of claim 17, wherein the at least one IP block includes a first IP block group and a second IP block group, wherein the re-booting comprises:

re-booting the main memory using third boot data corresponding to a sub-alternative mode, in response to a sub-alternative mode entry command requesting entry to the sub-alternative mode; and re-allocating a first sub-area of the second area allocated to the first IP block group to the second IP block group.

19. The method of claim 17, wherein the at least one IP block includes a first IP block group and a second IP block group, and wherein the re-booting comprises:

re-booting the main memory using third boot data corresponding to a sub-alternative mode, in response to a sub-alternative mode entry command requesting entry to the sub-alternative mode; and re-allocating a first sub-area of the second area allocated to the first IP block group to the first functional block.

20. An electronic system comprising:
an input device configured to receive an input;
a plurality of functional blocks each configured to perform operations according to a user request, the plurality of functional blocks including a first functional block and a second functional block;
a boot data memory configured to store first boot data and second boot data, the first boot data corresponding to an alternative mode and the second boot data corresponding to a standard mode;
a main memory including a first area and a second area, the first area associated with driving the first functional block and the second area associated with driving the second functional block; and
a processor configured to,
boot the electronic system using one of the first boot data and the second boot data based on an operation mode, and
adjust a ratio of a memory area of the first area and the second area by re-booting the electronic system using the first boot data, in response to the input device receiving an alternative mode entry command from the user.

* * * * *